United States Patent [19]
Jacobson

[11] Patent Number: 5,600,135
[45] Date of Patent: Feb. 4, 1997

[54] SPECTRAL GAIN STABILIZATION USING GROSS SHAPE FEATURES OF LARGELY INVARIANT SPECTRA

[75] Inventor: Larry A. Jacobson, Richmond, Tex.

[73] Assignee: Halliburton Company, Houston, Tex.

[21] Appl. No.: 467,221

[22] Filed: Jun. 6, 1995

[51] Int. Cl.$^6$ .................................................. G01V 5/04
[52] U.S. Cl. ................................. 250/261; 250/262
[58] Field of Search .......................... 250/261, 251.1 R, 250/262, 369

[56] References Cited

U.S. PATENT DOCUMENTS

| | | | |
|---|---|---|---|
| 4,209,695 | 6/1980 | Arnold et al. | 250/261 |
| 4,409,481 | 10/1983 | Smith, Jr. et al. | 250/270 |
| 4,492,863 | 1/1985 | Smith, Jr. | 250/262 |
| 4,737,636 | 4/1988 | Smith, Jr. | 250/269 |
| 4,746,801 | 5/1988 | Smith, Jr. et al. | 250/270 |
| 4,990,774 | 2/1991 | Smith, Jr. et al. | 250/269 |
| 5,055,675 | 10/1991 | Bridges | 250/262 |
| 5,313,504 | 5/1994 | Czirr | 376/153 |
| 5,360,975 | 11/1994 | Stoller | 250/262 |
| 5,406,078 | 4/1995 | Jacobson | 250/261 |

Primary Examiner—Michael J. Tokar
Assistant Examiner—Kiet T. Nguyen

[57] ABSTRACT

A method for providing gain stabilization to a nuclear spectroscopy tool by use of gross features of largely invariant spectra. A particle or gamma ray energy spectrum of an earth formation and wellbore are measured. A ratio of the number of particles or gamma rays measured in a first energy window to the number of particles or gamma rays measured in a second energy window is calculated. The gain of the nuclear spectroscopy tool is adjusted as a function of the calculated ratio. The first energy window is selected to span substantially an entire range of measured energies for the spectrum and the second energy window is selected to span an upper range of the measured energies for the spectrum.

11 Claims, 8 Drawing Sheets

SPECTRAL GAIN STABILIZATION USING GROSS SHAPE FEATURES OF LARGELY INVARIANT SPECTRA

BACKGROUND OF THE INVENTION

1. Field of the Invention

This invention relates to a method of regulating gain for downhole spectroscopy tools without using a calibration source. In particular, it relates to a method of adjusting the gain of this equipment using features from the measured energy spectrum of an earth formation.

2. Description of the Related Art

The major objective of well logging is to obtain quantitative and qualitative information related to hydrocarbons in earth formations surrounding a well. In many nuclear well logging techniques the formation and borehole are irradiated by energetic nuclear particles such as neutrons and gamma rays. These particles may either be scattered in the formation or the borehole or they may undergo a nuclear reaction which results in the creation of a new particle or a gamma ray. The scattered particles or newly created particles can be detected at one or several locations and by one or more detectors. The number of energy particles detected and their energy levels generate signals that contain information about the irradiated earth formation and the borehole. During the logging process, various processing techniques can be applied to these signals in order to get the desired logging information from the signal. For example, one of these processing techniques is comparing features of these signals with other known data to make determinations about the information contained in the signals.

Many of the nuclear well logging techniques compare the measured signal with additional information. Many of the techniques compare the measured signals with other data based on spectral analysis of the measured signal. As stated earlier, these signals are sometimes gamma rays that result from interactions of atoms with neutrons emitted from a downhole radiation source. Such gamma ray signals are representative of certain atoms of the lithology of the formation (i.e. the matrix or the formation fluid) or of the borehole. In one example of spectral analysis, the energy spectrum of gamma rays resulting from the capture of the neutrons is decomposed into contributions due to individual formation elements, usually called "elemental yields". These elemental yields reveal information concerning the presence of earth formation elements such as hydrogen, silicon, calcium, chlorine, sulfur, and iron. Important petrophysical parameters such as porosity, matrix lithology, and water salinity may be derived from the elemental yields.

In all well logging techniques, the calibration of the signal is very important to the measurement of the signal. In these calibration processes, reference signals are used to align the measured signal with certain time or energy parameters. If there is not an adequate alignment between the reference point and the appropriate feature of the signal, an adjustment of the signal amplitude may be necessary to align the signal with the calibration reference. In addition, an adjustment of the signal amplitude may be needed to provide an adequate signal for measurement.

Since the alignment of features from the measured spectrum with features of a standard spectrum may be crucial in these techniques, it is important to guard against drifts and other variances between the measured spectrum and the standard spectrum. Any drifts that occur along the signal chain during the course of the measurement can cause peaks in the measured spectrum to be displaced, broadened, or otherwise distorted. If this occurs, the proper fit may not be obtained and measured information could be lost. These drifts can develop through changes in temperature of the detector or associated electronics, gradual changes in voltage levels, or variations of the gain of the various active elements in the signal chain. Despite the best efforts to control temperature and other environmental conditions, spectra taken over long periods of time with high resolution detectors often suffer an apparent loss of resolution due to these drifts. In some detectors, large changes in counting rates can also lead to apparent gain changes over fairly short periods of time.

One parameter that is important in controlling measurement drifts and adjusting signal amplitudes is gain. The gain is the change in the signal amplitude necessary to keep the signal at an appropriate amplitude level. In gamma ray or particle energy spectroscopy it is important that the gain of the system be known and constant at all times. If the gain is unknown it is difficult or nearly impossible to analyze the spectrum for its components. Small variations in the gain during the spectrum measurements will lead to a degradation of the spectrum resolution. If the gain variation is large the spectrum can no longer be analyzed and the information is lost.

During the detection of gamma rays, gain regulation for energy dispersive gamma-ray detectors in general and for scintillation detectors in particular has been done in many different ways. If the environmental conditions of a system, including the gamma ray flux, can be kept constant it may be sufficient to do periodic calibration of the detectors at intervals of hours or days using radioactive sources. This requires that signal drifts due to temperature or equipment component changes be almost imperceptible.

One example of the importance of gain regulation is seen using scintillation detectors and photomultipliers (PMT). Many gamma ray detection systems use scintillation detectors and photomultipliers. The gain of a PMT can change due to small changes in the surface conditions of the electrodes in the interior of the PMT. These changes can occur as a consequence of tube start up or during long operation due to the constant electron (and ion) bombardment of the electrodes which are responsible for the amplification process in the PMT.

The properties of scintillators do not change rapidly unless a catastrophic failure (breakage or chemical change) occurs. The light emission however depends strongly upon the temperature of the crystal. If the temperature can be kept constant it is possible to stabilize the gain of the PMT by the use of a highly accurate light pulser which sends known constant amounts of light to the PMT. The gain of the PMT can be adjusted so that the light pulse always generates the same amplitude. This adjustment can be achieved by analog or digital techniques. However, this method does not correct for any changes in the scintillation light output.

In addition, in well logging the temperature of the tool in the wellbore is known to change dramatically from the surface (about 25° C.) to the bottom of the hole where the temperature can reach 150° C. and more. Under these circumstances the gain of a scintillation detector and its associated PMT can vary by a factor two or more, therefore constant adjustment of the gain is necessary. Many applications require that the gain be kept constant to much better than one percent. Even if the detector is kept in a dewar the temperature changes are usually large enough to generate intolerable gain changes.

Known methods for gain stabilization exist which utilize a radioactive source, the characteristic gamma-ray spectrum of which is utilized as a reference signal to stabilize the gain. This has the advantage that the gain for the entire system, including the preamplifier and A/D converter can be kept constant. However, in many applications the extra signal from the stabilization source is adding significantly to the background and therefore impeding the measurement of interest. This can be alleviated by using a gamma-ray source with a gamma-energy which is outside of the range of interest and/or by using various coincidence techniques. In the case of a neutron induced gamma-spectrum, the count rates in the gamma-spectrum are very high. At the present, this necessitates the use of a strong gamma-source for gain stabilization. This source however can be detrimental to parts of the measurements for which the count rate of interest is much lower. For example, the precision of the measurement of the formation capture cross section is strongly affected by a large number of background counts.

Figure 1:
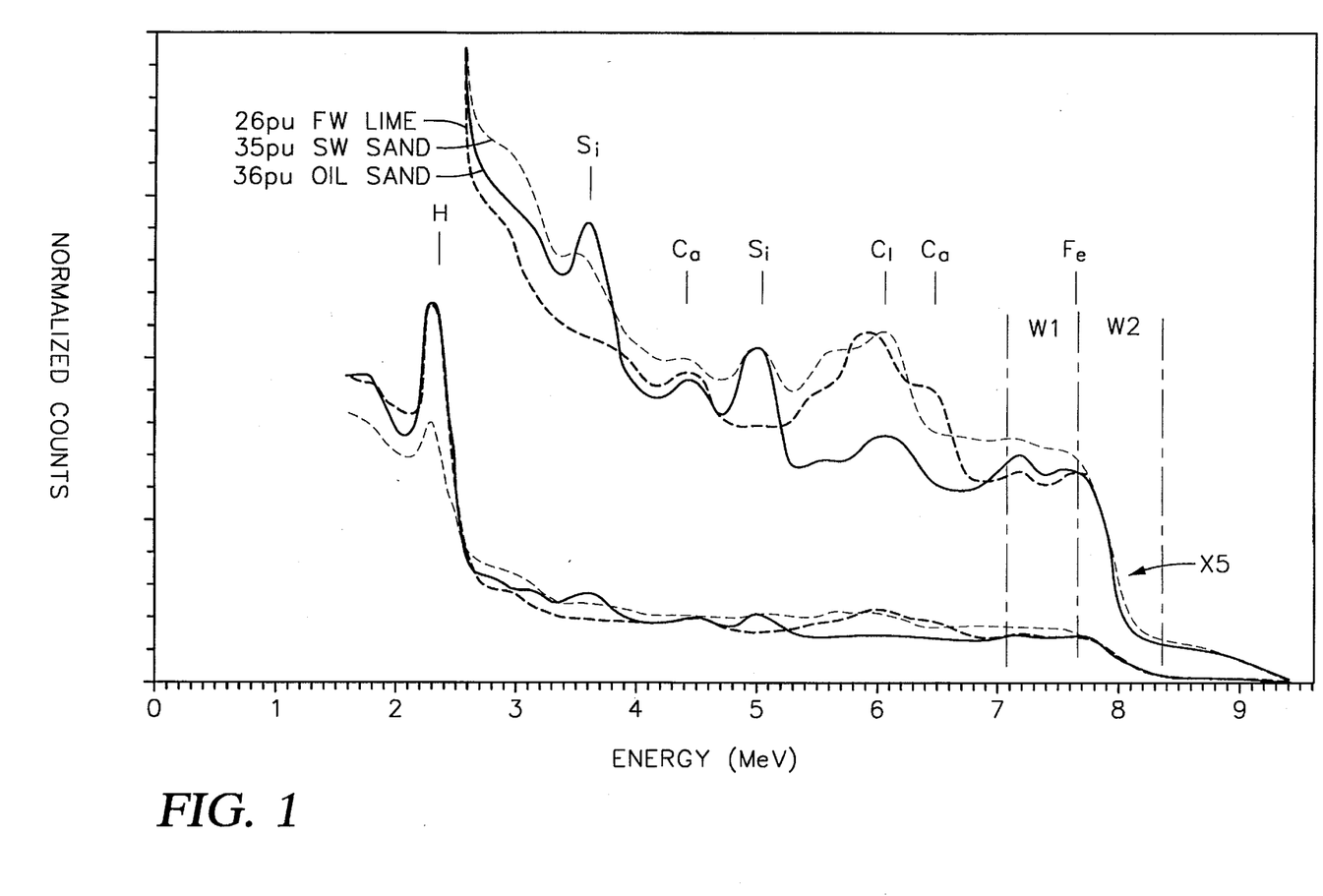
FIG. 1 is a graphical illustration of a typical capture gamma ray spectrum and the use of energy windows for gain stabilization in a Pulsed Spectral Gamma Tool.

Known methods of gain stabilization also exist which do not rely upon the use of a calibration source at all. Rather, such methods rely upon an invariant feature of the recorded spectrum for stabilization. One such method utilized in a Pulsed Spectral Gamma Tool (PSGT), available from Halliburton Energy Services of Houston, Tex., and disclosed in U.S. Pat. No. 5,406,078, relies upon an invariant feature in the capture gamma-ray spectrum. As illustrated in FIG. 1, the capture gamma-ray spectrum for the typical operating environment for this logging tool includes an abrupt drop in the spectrum above the iron (Fe) full energy peak at 7.65 MeV. The PSGT, which provides gamma-ray spectral data for inelastic, capture and activation gammas, is primarily a cased-hole tool therefore there is always a significant Fe response in the capture gamma-ray spectrum from both the casing and the tool housing. Moreover, there are no common elements in the surrounding environment that will produce significant gamma-rays above the Fe peak, thus this feature is relatively invariant throughout the logging process. Furthermore, this feature is located near the top of the recorded capture gamma-ray spectrum for the PSGT which is an ideal position for a feature that is to be used for gain stabilization. While the sharp drop-off above the Fe peak is prominent, often the Fe peak itself is not, so stabilizing the Fe peak is not robust. Therefore, two adjacent windows, W1 and W2, each approximately 600 KeV in width, are positioned across this drop-off such that the common boundary of the two windows is centered near the start of the drop-off. For a typical application the ratio of the counts in window W1 to the counts in window W2 is equal to two. A hardware/software servo-loop is then utilized in the PSGT to adjust the system gain to maintain a ratio (counts in W1/counts in W2) of two throughout the logging operation. This technique has been found to be highly reliable in practice.

The method of gain stabilization relied upon for the PSGT, while highly effective, is not a reliable method for applications in which there is a weak response to the Fe peak and accompanying sharp drop-off. One such application is in the use of a Thermal Multigate Decay—Lithology Tool (TMDL). The TMDL, like the PSGT, also provides gamma-ray spectral data for inelastic, capture, and activation gammas. The TMDL utilizes near and far detectors which are typically small NaI detectors resulting in a weak response to the Fe peak and abrupt drop-off particularly for the far detector. Consequently, the gain stabilization technique utilized in the PSGT does not perform reliably for the TMDL.

The present invention is directed to providing a method for gain stabilization which will provide reliable performance for applications, such as in the TMDL, in which there are no sharp discernible edge features in the measured spectra.

SUMMARY OF THE INVENTION

A new method is provided for gain stabilization in spectroscopy tools. A measurement of a particle or gamma ray energy spectrum of an earth formation and wellbore are made. The ratio between the number of particles or gamma rays measured in a first energy window to the number of particles or gamma rays measured in a second energy window is then calculated. The gain of the spectroscopy tool is then adjusted to maintain this ratio substantially constant during operation. The first energy window is selected to span substantially the entire range of measured energies for the spectrum while the second energy window is selected to span an upper range of the measured energies for the spectrum.

BRIEF DESCRIPTION OF THE DRAWINGS

The present invention will become more fully understood from the following detailed description of the preferred embodiments, taken in conjunction with the accompanying drawings in which.

DETAILED DESCRIPTION OF PREFERRED EMBODIMENTS

Turning to the drawing figures, the following preferred embodiment of the present invention provides gain stabilization by using gross shape features of largely invariant spectra. The preferred embodiment of the present method is applied to a Thermal Decay Multigate Decay—Lithology Tool (TMDL). The teachings disclosed in the following discussion of the preferred embodiment will however find further application in any well logging tool where it is desired to provide gain stabilization relying solely upon a measured spectra.

Figure 2:
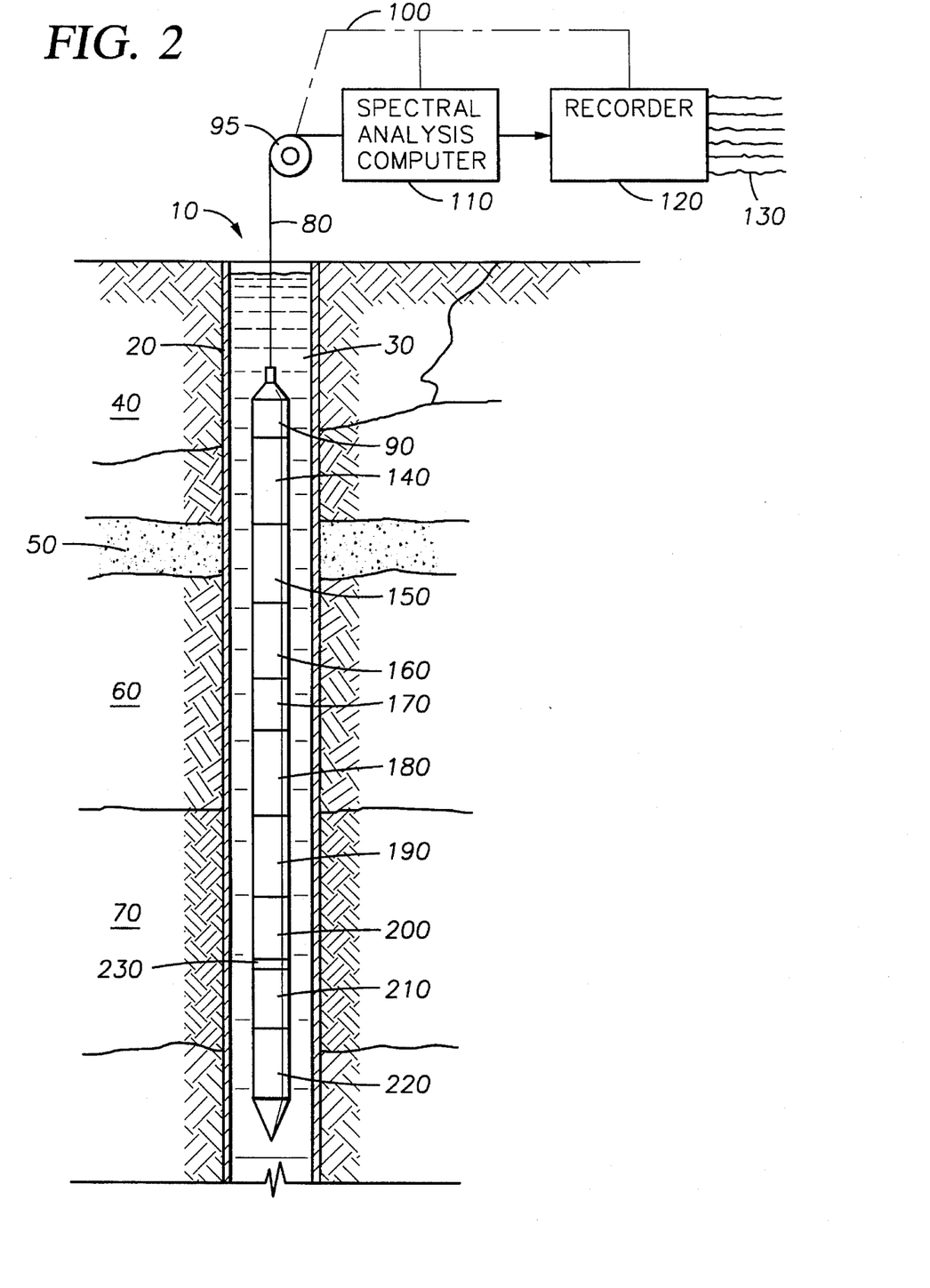
FIG. 2 is a schematic illustration of a Thermal Multigate Decay—Lithology Tool positioned within a wellbore traversing a formation.

Turning now to FIG. 2, a well logging system for performing thermal multigate decay logging will now be described. A well borehole 10 lined with a steel casing 20 and filled with a borehole fluid 30 penetrates earth formations 40, 50, 60, and 70. A well logging cable 80, which is of the usual armored multiconductor cable type, supports in the borehole 10, a well logging sonde 90 for making neutron induced gamma ray spectral measurements in accordance with the concepts of the present invention. The well logging sonde 90 may be any logging tool which measures the energy spectra for the wellbore 10 and surrounding formations in the form of gamma rays or other energized particles such as, for example, neutrons modified in accordance with the teachings of the present method to provide gain stabilization. In a preferred embodiment, the logging sonde 90 is conventional TMDL logging tool, available from Halliburton Energy Services, of Houston, Tex., modified in accordance with the teachings of the present method to provide gain stabilization. The well logging cable 80 passes over a sheave wheel 95 which may be electrically or mechanically coupled, as indicated by a dotted line 100, to a spectral analysis computer 110 and a data recorder 120. The spectral analysis computer 110 may comprise, for example, any suitably programmed general purpose computer capable of receiving signals from the downhole equipment. The recorder 120 may comprise a strip chart recorder, as indicated having a record medium 130, or it may comprise a digital tape or a disk file memory as desired.

Figure 3A:
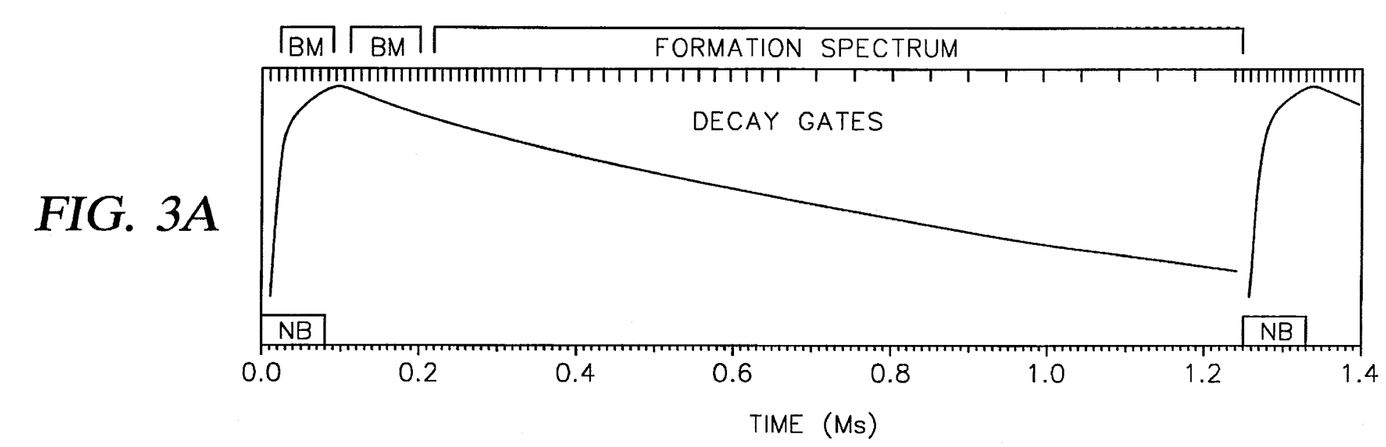
FIG. 3A is a graphical illustration of a typical fast timing subcycle for the Thermal Multigate Decay—Lithology Tool.
Figure 3B:
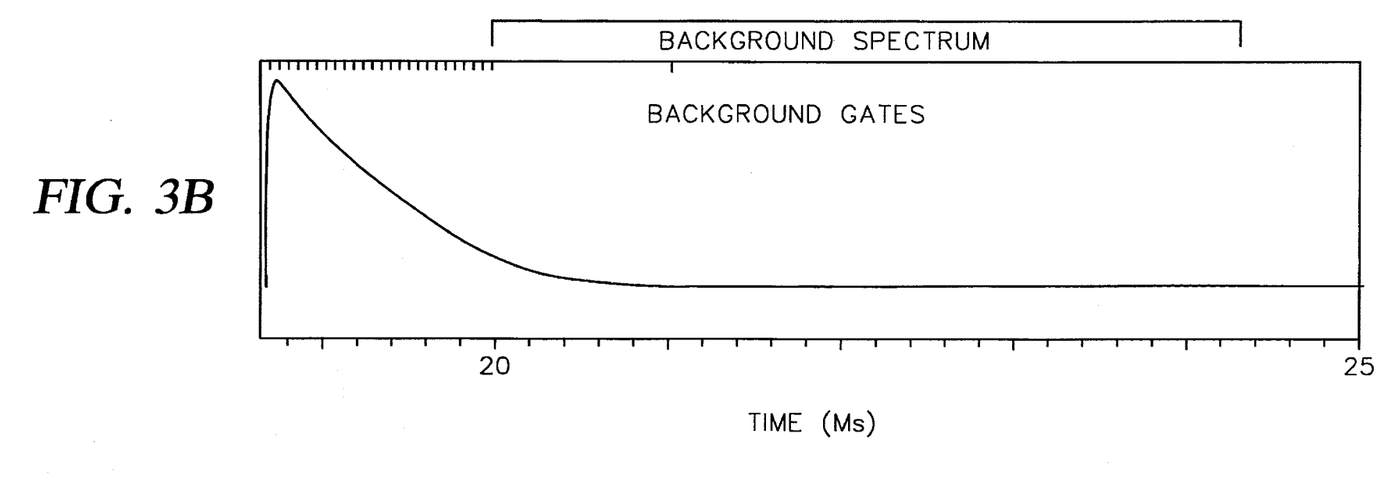
FIG. 3B is a graphical illustration of a typical slow timing subcycle for the Thermal Multigate Decay—Lithology Tool.

The downhole sonde 90 includes a power supply 140, a timing circuit 150, a telemetry circuit 160, a gain stabilizer 170, a pulse height analyzer 180, a far detector 190, a near detector 200, a neutron source 210, and a high voltage power supply 220. In operation, the power supply 220 takes power from one or more of the conductors of the logging cable 80 and converts it to appropriate voltage and current levels for supplying internal circuits of the downhole sonde 90 with electrical power as required. The timing circuit 150, as will be discussed in more detail subsequently, in conjunction with FIGS. 3A and 3B, provide timing pulses for opening and closing various data gates to enable various gamma-ray detection procedures. The telemetry circuit 160 is a conventional digital telemetry system capable of communicating to and from the surface supplied equipment at a rate of 15–20 kilobits/sec.

The gain stabilizer circuit 170, which will be described in more detail subsequently, operates in conjunction with the pulse height analyzer 180. The pulse height analyzer 180 receives signals from the detectors 190 and 200. The detector signals are representative of gamma rays impinging upon the detectors 190 and 200 and which have been induced by a neutron bombardment from a neutron source 210 which is supplied for its operation an approximately 100 kilovolt high voltage power supply 220 or from a background gamma ray source.

Each of the detectors 190 and 200 may include, for example, thalium activated sodium iodide (NaI) crystals which are optically coupled to photomultiplier tubes (PMT). The detectors 190 and 200 serve to detect gamma radiation produced in the surrounding formations resulting from the action of the neutron generator 210 in emitting neutrons. A neutron shielding material having a high density matter content or large scattering cross section is typically interposed between the neutron generator 210 and the dual spaced detectors 190 and 200 in order to attenuate direct irradiation of the detectors 190 and 200 by neutrons emitted from the generator. Shielding may also be interposed between the detectors 190 and 200 if desired.

Turning now to FIGS. 3a and 3b, the conventional timing cycles associated with the measurement of the elastic, inelastic, and background spectra for the borehole 10 and surrounding formations utilized by the logging sonde 90 will be described. FIG. 3a illustrates a fast timing cycle while FIG. 3b illustrates a slower timing cycle.

Referring initially to FIG. 3B, a timing cycle of 6.25 milliseconds in duration and repeated once every 25 milliseconds is illustrated. The neutron source 210 is turned on for a 14 MeV neutron pulse having a time duration of approximately 80 microseconds at the beginning of this 6.25 millisecond duration sub-cycle.

During the 1250 microseconds beginning when the neutron source 210 is turned on, a plurality of time gates are opened to measure the thermal neutron population die-away as a function of time. Up to 61 time gates may be used as desired according to well known techniques. Using such well known techniques, the borehole and formation thermal neutron capture cross-sections are measured. Thus the die-away of thermal neutrons produced by the moderation of the fast neutrons emitted by the neutron source 210 are detected for the first 1.25 milliseconds of this 6.25 millisecond subcycle. For the remaining five milliseconds of the subcycle portion of FIG. 3b, the detectors 190 and 200 are used to detect background gamma radiation due to naturally occurring gamma rays in the earth formations surrounding the wellbore by means of three background gates of 1 ms, 1 ms, and 3 ms duration. The far detector 190 further makes a 256 channel spectral measurement during this five millisecond period. All measurements taken by the detectors 190 and 200 may thus be corrected for background based on this background measurement by substraction of the appropriately scaled count rate. Inelastic scatter measurements may also be corrected for capture gamma radiation by extrapolating measured capture gamma radiation intensity back to the time of the neutron burst using the measured die-away constant.

During the fast timing subcycle portion of the timing diagram illustrated in FIG. 3a, the neutron source 210 is pulsed on for eighty microsecond duration pulses (indicated as NB in the timing diagram). In FIG. 3a, 61 capture gamma ray time gates are opened at the start of the neutron burst to record the inelastic and thermal capture decay signal. The initial 32 time gates are 10 μs wide, the next 16 are 20 μs wide, the next 12 are 50 μs wide, and one last gate is 10 μs. Simultaneously, the far detector 190 makes three 256 channel spectral measurements, one during the neutron burst, one immediately after the neutron burst, and one during the formation decay.

The entire short or fast pulse timing cycle is then repeated beginning at the time labeled 1.25 milliseconds of FIG. 3a and the neutron source 210 and detectors 190 and 200 timing are repeated as previously described for the next 1.25 milliseconds. The entire sequence which is illustrated in FIG. 3a is repeated for a period of 20 milliseconds. The short or fast pulse subintervals of 1.25 milliseconds are time interlocked with the longer 5 millisecond background interval illustrated in FIG. 3B. Timing pulses suitable for this purpose are produced in the timing circuit 150.

Figure 4:
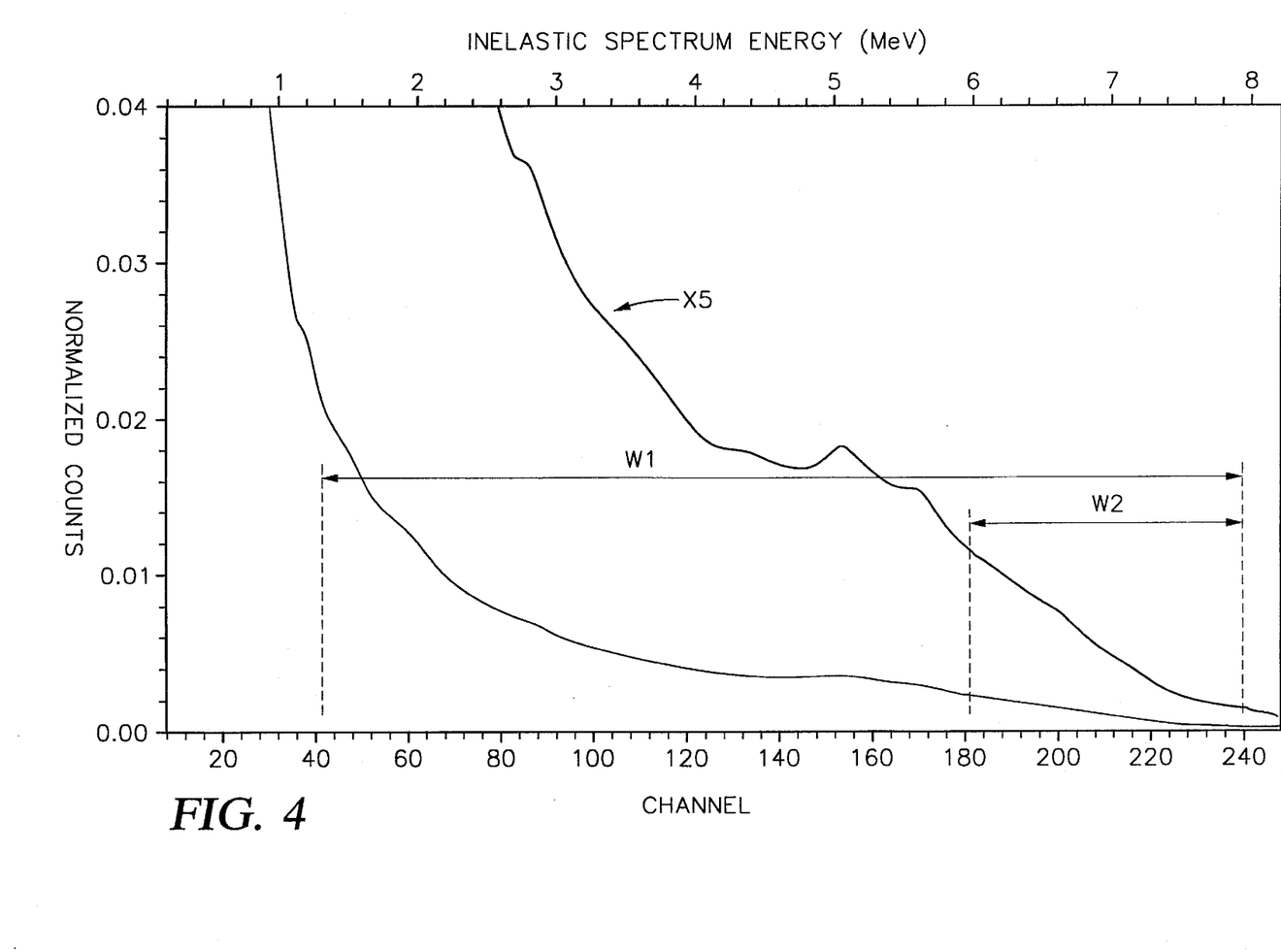
FIG. 4 is a graphical illustration of a typical inelastic gamma ray spectrum and the use of energy windows W1 and W2 for gain stabilization in the preferred embodiment.

Referring now to FIG. 4, an inelastic gamma ray spectrum which comprises gamma ray pulses detected by the far detector 190 during the inelastic gamma ray gates in FIG. 3a and supplied to the pulse height analyzer 180 during the time when the neutron bursts are on is shown. It will be observed that in the inelastic gamma ray spectrum that inelastic scattering peaks attributable to carbon, oxygen, silicon, and calcium are not very prominent in the inelastic gamma ray spectrum. The inelastic gamma ray spectrum of course is caused by fast neutron scattering from the nucleus of an element in the vicinity of the borehole 10 and exciting these nuclei to higher energy levels thereby losing some of the energy of the scattered neutrons (i.e. scattering with energy loss). The excited nuclei returning to the ground state emit gamma rays characteristic of each of the nuclear species.

Figure 5:
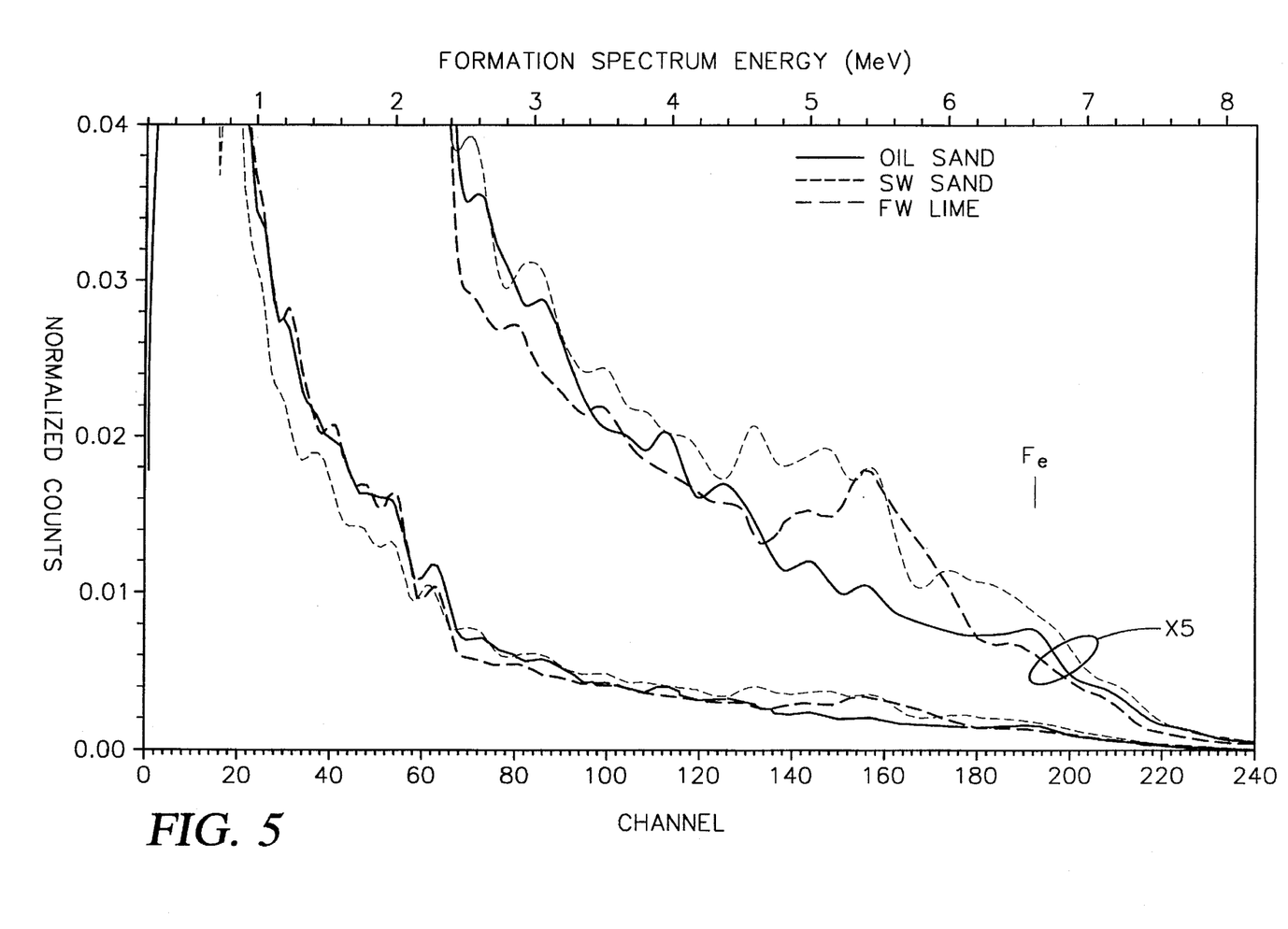
FIG. 5 is a graphical illustration of a typical capture gamma ray spectrum for a Thermal Multigate Decay—Lithology Tool.

Referring now to FIG. 5, a capture gamma ray spectrum is shown for the present well logging system. The capture gamma ray spectrum is taken during the formation decay in FIG. 3a. This spectrum is attributable to the emission of gamma rays by the decay to the ground state of nuclei which have been excited by the capture of thermalized neutrons. Notice how poorly defined is the drop-off above the Iron peak in this spectrum.

Comparing FIGS. 1 and 5, it will be seen that the iron peak and drop-off observed for the capture gamma ray spectrum for the PSGT is not nearly as prominent in the TMDL. This is due to the small size of the NaI detector used in the far detector 190 of the TMDL. Thus the gain stabilization technique utilized in the PSGT will not yield reliable results in the TMDL. However, the inelastic spectrum for the TMDL illustrated in FIG. 4, which is dominated by the inelastic oxygen spectrum (accounting for 80 to 90% of the total spectrum), is reasonably invariant in shape.

The present method relies upon the invariant nature of the inelastic spectrum to provide gain stabilization by the selection of a pair of energy windows W1 and W2. The first energy window W1 spans substantially the entire spectrum while the second energy window W2 spans an upper range of the spectrum. The ratio of the counts in W1 to those in W2 is then calculated and compared to a reference value to control the system gain. The method may be adapted for use with any measured invariant spectra with the particular reference value for the ratio of counts in the energy window W1 to those in the energy window W2 determined during an initial calibration of the particular nuclear well logging tool.

Referring again to FIG. 4, in an exemplary embodiment, for a TMDL logging sonde 90, available from Halliburton Energy Services of Houston, Tex., a first energy window W1, spanning substantially the entire inelastic spectrum, and a second energy window W2, spanning an upper portion of the inelastic spectrum are selected to provide gain stabilization of the TMDL. The ratio of the counts in the first energy window W1 to the counts in the second energy window W2 are maintained at about 16 for optimum performance. Experimental results for recorded spectra for a wide variety of test-pit environments (using different boreholes, different formation lithologies, and different formation fluid types) revealed that a ratio of 16 resulted for properly gain adjusted spectra and this value was constant to within 2% as a function of the external environmental changes. However, this ratio value changed rapidly with gain changes. This established that the method would have adequate sensitivity to gain changes to be used in a servo-type system for automatic gain stabilization. An analysis of actual count-rates in the two windows, W1 and W2, showed that for the ratio to be determined with a statistical precision of ±1%, an integration time of about 10 seconds would be required. Actual gain drifts of typical uncompensated systems are much slower than this, consequently, statistical effects should not be a limitation to satisfactory performance.

Figure 6:
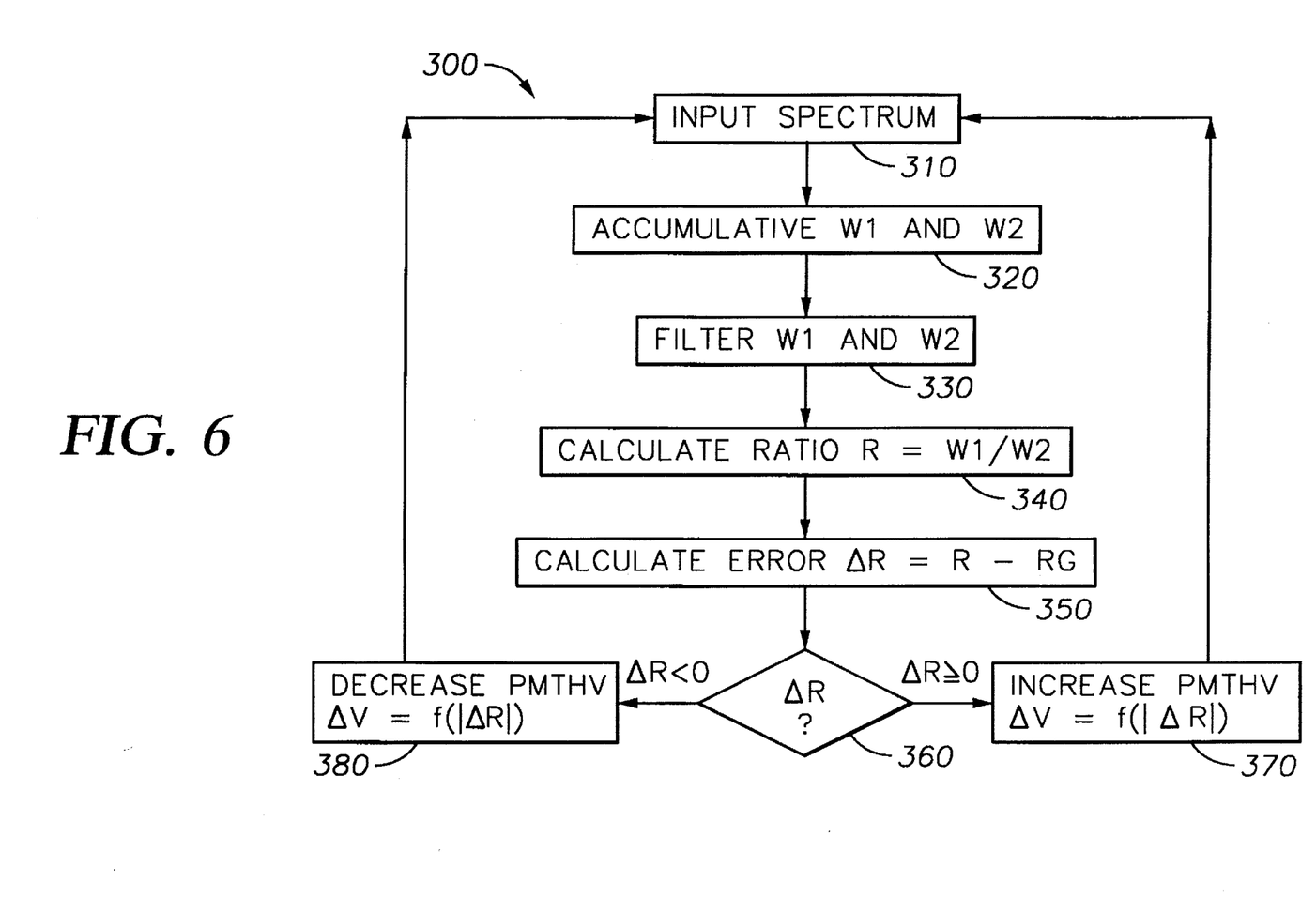
FIG. 6 is a flow diagram illustrating gain stabilization by providing servo-loop control of the photomultiplier voltage level.

Referring now to FIG. 6, a flow diagram 300 for gain stabilization by controlling the voltage supply level for the photomultiplier for the far detector 190 will be described. The steps illustrated in the flow diagram 300 are implemented by the gain stabilization circuit 170 using conventional control algorithms such as, for example, proportional-integral-differential (P-I-D) control which in turn provides a control signal to the power supply 140 for the photomultiplier of the far detector 190. After inputting the measured spectrum in step 310, the number of counts in energy windows W1 and W2 are accumulated in step 320. The accumulated counts for the windows W1 and W2 are then depth filtered in step 330. The filtering step 330 will preferably include a correction for background radiation. In step 340, the ratio R of the number of counts in the first window W1 to the number of counts in the second window W2 is then calculated. The calculated ratio R is then compared with the reference value RG in step 350 by subtracting the reference value RG from the calculated ratio R to generate the error $\Delta R$. If the error $\Delta R$ is greater than or equal to zero, then the gain of the far detector 190 is increased in steps 360 and 370 by increasing the voltage supply level to the photomultiplier for the far detector 190. If the error $\Delta R$ is less than zero, then the gain of the far detector 190 is reduced in steps 360 and 380 by reducing the voltage supply level to the photomultiplier for the far detector 190.

The flow diagram illustrated in FIG. 6 may alternatively be applied directly to the system electronics of the logging sonde 90 by the gain stabilizer circuit 170 to thereby control the gain by means of conventional signal conditioning circuitry such as, for example, operation amplifiers, rather than by controlling the gain of the PMTs. In this manner the output signal from the far detector 190 is adjusted by controlling the gain of the signal conditioning circuitry.

Figure 7:
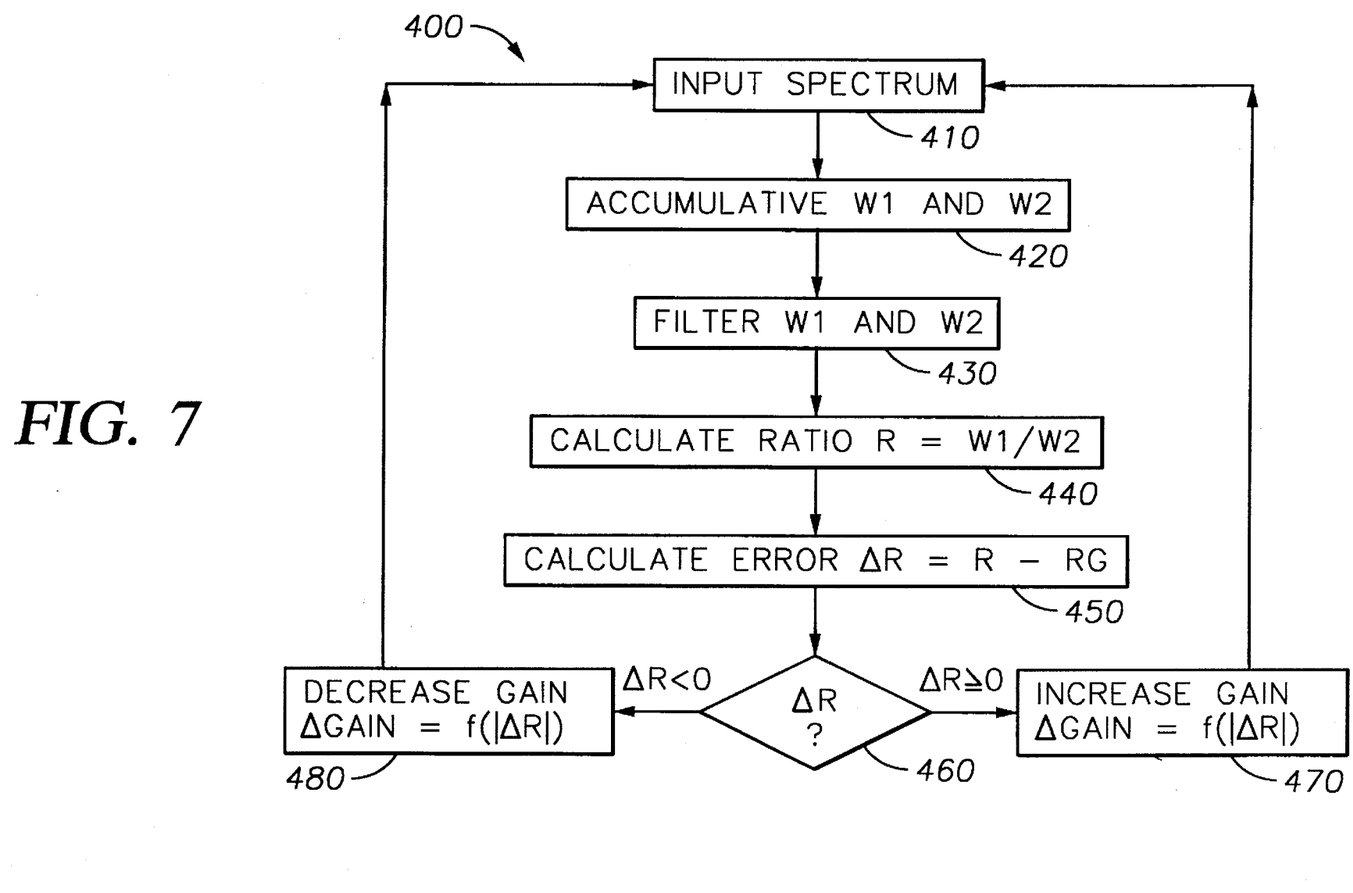
FIG. 7 is a flow diagram illustrating gain stabilization by providing servo-loop control of the signal conditioning circuitry.

Referring now to FIG. 7, a flow diagram 400 for gain stabilization by controlling the system gain for the logging sonde 90 will be described. The steps illustrated in the flow diagram 400 are implemented by the gain stabilization circuit 170 using conventional control algorithms such as, for example, proportional-integral-differential (P-I-D) control which in turn provides control signals to the signal conditioning circuitry for the output signal of the far detector 190. After inputting the measured spectrum in step 410, the number of counts in energy windows W1 and W2 are accumulated in step 420. The accumulated counts for the windows W1 and W2 are then depth filtered in step 430. The filtering step 430 will preferably include a correction for background radiation. In step 440, the ratio R of the number of counts in the first window W1 to the number of counts in the second window W2 is then calculated. The calculated ratio R is then compared with the reference value RG in step 450 by subtracting the reference value RG from the calculated ratio R to generate the error $\Delta R$. If the error $\Delta R$ is greater than or equal to zero, then the gain of the signal conditioning circuitry for the far detector 190 is increased in steps 460 and 470. If the error $\Delta R$ is less than zero, then the gain of the signal conditioning circuitry for the far detector 190 is reduced in steps 460 and 480.

The functional relationship between the gain correction signal and the magnitude of the error signal may be linear with error magnitude or preferably will provide increased gain adjustment for large error signals and reduced gain adjustment for smaller error signals. In this manner, the correction will accelerate convergence for large error signals and reduce jitter in the gain correction signal for smaller error signals.

Figure 8:
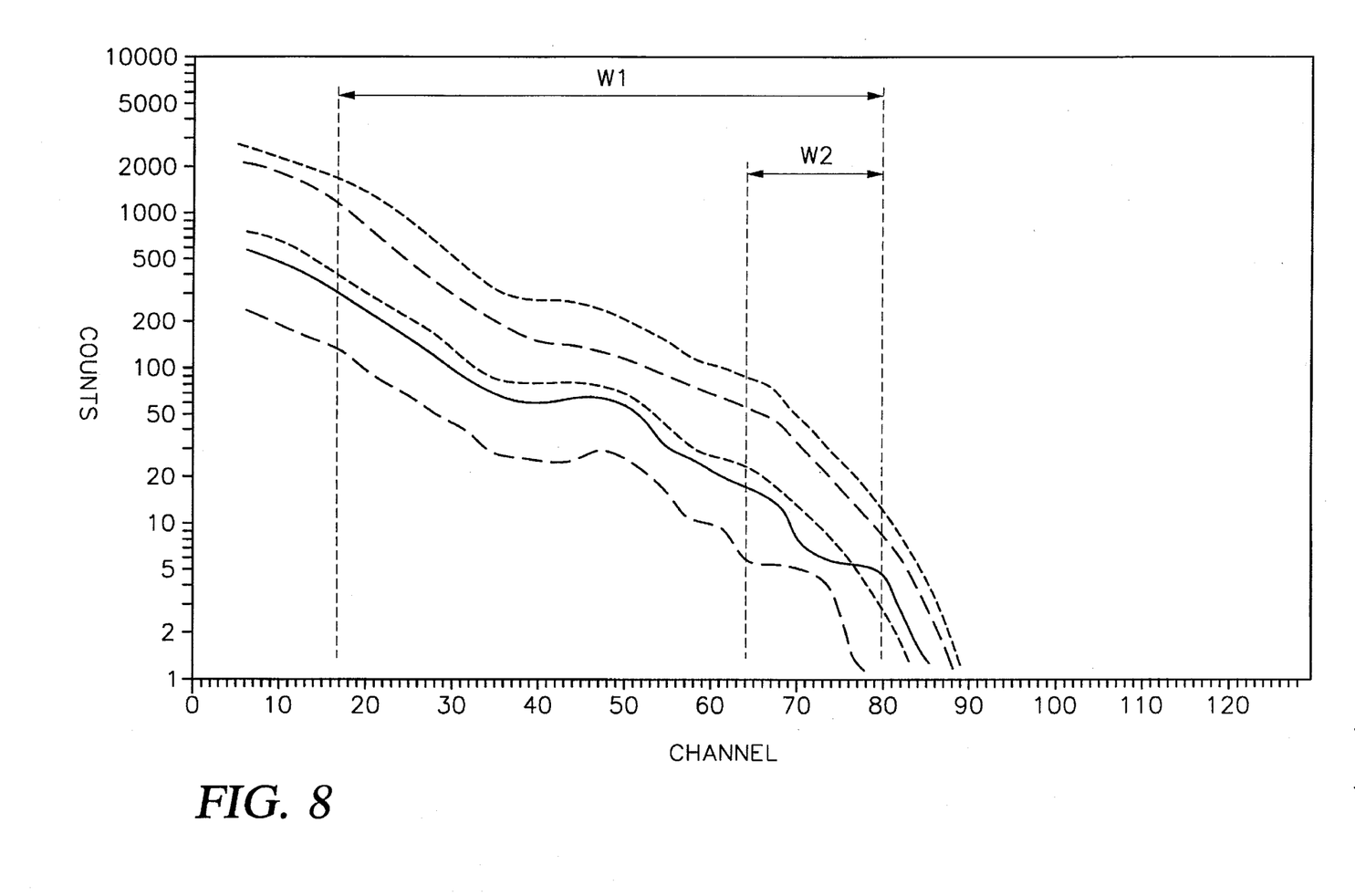
FIG. 8 is a graphical illustration of a typical beta decay spectrum and the use of energy windows W1 and W2 for gain stabilization in the preferred embodiment.

The present method may be utilized whenever gain stabilization is necessary based upon largely invariant spectra lacking sharp features (i.e. peaks and edges). One example of a largely invariant spectra lacking sharp features is a beta spectra as illustrated in FIG. 8. The beta spectra is the product of beta decay of fast neutron activated oxygen within an additional detector 230 within the logging sonde 90 that is used for monitoring the output of the neutron generator 210.

The neutron detector 230 monitors the neutron output of the neutron generator 210, in a well known manner, based upon the principal of beta decay within the neutron detector 230 itself as disclosed in U.S. Pat. No. 5,313,504, the disclosure of which is incorporated herein by reference. The neutron detector 230 includes a scintillation crystal optically coupled to a photomultiplier tube. The neutron detector 230 preferably utilizes a yttrium silicate crystal, a yttrium aluminate crystal, or a lutetium phosphate crystal. The crystal may be activated, for example, with cerium. The pulse height analyzer 180 receives signals from the neutron detector 230. The neutron detector signals are representative of neutrons impinging upon the neutron detector 230 from the neutron source 210.

The typical spectrum of beta decay detected by the neutron detector 230 is relatively featureless but does terminate abruptly at the beta end-point energy. The neutron detector 230 requires gain stabilization which is accomplished according to the methods previously discussed by selecting windows W1 and W2 for use in calculating the ratio of counts in W1 to those in W2, comparing the ratio to a reference value, and then adjusting the gain of the system, by controlling the voltage supply level of the photomultiplier tube or the gain for the output signal of the neutron detector 230, to maintain the ratio within predetermined limits.

A method for providing spectral gain stabilization has been described which relies upon gross shape features of largely invariant spectra. The method will find application in any number of nuclear well logging applications where conventional gain stabilization techniques are unreliable or undesirable. The present method does not rely upon sharp features (i.e. peaks and edges); rather gross features are relied upon. If the spectrum is relatively invariant in shape throughout the operational range of the measurement, adequate gain stabilization can be provided by using gross features of the total spectrum. One limitation of the present method is that it does not provide proper gain stabilization for any spectrum that is closely characterized as being exponential in shape (even though invariant in time and characteristic decay constant).

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method for regulating the signal gain of a nuclear well logging apparatus positioned within a wellbore traversing an earth formation, by using a measured spectrum that is relatively invariant, comprising the steps of:

(a) measuring a particle or gamma ray energy spectrum of said earth formation and said wellbore;

(b) calculating a ratio of a number of said particles or gamma rays measured in a first energy window to a number of said particles or gamma rays measured in a second energy window;

(c) adjusting said gain of said nuclear well logging apparatus as a function of said calculated ratio; and (d) repeating steps (a) through (c) as said nuclear well logging apparatus traverses said wellbore;
  wherein said first energy window is selected to span substantially an entire range of measured energies for said spectrum; and
  wherein said second energy window is selected to span an upper range of said measured energies for said spectrum.

2. The method of claim 1, wherein said step of adjusting said gain comprises the step of:
  subtracting said ratio from a reference value to generate an error value.

3. The method of claim 2, wherein said step of adjusting said gain further comprises the steps of:
  increasing a voltage supply level for a photomultiplier if said error value is greater than or equal to zero; and
  decreasing said voltage supply level for said photomultiplier said error value is less than zero.

4. The method of claim 2, wherein said step of adjusting said gain further comprises the steps of:
  increasing a gain of a signal conditioning circuitry if said error value is greater than or equal to zero; and
  decreasing said gain of said signal conditioning circuitry if said error value is less than zero.

5. The method of claim 1, wherein said measured spectrum is an inelastic gamma ray spectrum.

6. The method of claim 1, wherein said measured spectrum is a beta decay spectrum.

7. A method for regulating the gain of a nuclear well logging apparatus positioned within a wellbore traversing an earth formation, by using a measured spectrum that is relatively invariant, comprising the steps of:
  measuring a particle or gamma ray energy spectrum of said earth formation and said wellbore;
  calculating a ratio of a number of said particles or gamma rays measured in a first energy window, said first energy window spanning substantially an entire range of measured energies for said spectrum, to a number of said particles or gamma rays measured in a second energy window, said second energy window spanning an upper range of said measured energies for said spectrum;
  generating an error value by subtracting said calculated ratio from a reference value
  adjusting said gain of said nuclear well logging apparatus by varying a voltage supply level for a photomultiplier detector where said error value exceeds a predetermined range.

8. A method for regulating the gain of a nuclear well logging apparatus positioned within a wellbore traversing an earth formation, by using a measured spectrum that is relatively invariant, comprising the steps of:
  measuring a particle or gamma ray energy spectrum of said earth formation and said wellbore;
  calculating a ratio of a number of said particles or gamma rays measured in a first energy window, said first energy window spanning substantially an entire range of measured energies for said spectrum, to a number of said particles or gamma rays measured in a second energy window, said second energy window spanning an upper range of said measured energies for said spectrum;
  generating an error value by subtracting said calculated ratio from a reference value adjusting said gain of said nuclear well logging apparatus by varying a gain of a signal conditioning circuitry where said error value exceeds a predetermined range.

9. A method for controlling gain in a nuclear well logging apparatus positioned inside a wellbore traversing an earth formation, the steps comprising:

(a) generating an energetic particle induced spectrum in said earth formation and well borehole;

(b) measuring a particle or gamma ray energy spectrum of said earth formation and said wellbore;

(c) correcting said energy spectrum for earth formation background radiation effects;

(d) calculating a ratio of a number of said particles or gamma rays measured in a first energy window, said first energy window spanning substantially an entire range of measured energies for said spectrum, to a number of said particles or gamma rays measured in a second energy window, said second energy window spanning an upper range of said measured energies for said spectrum;

(e) generating an error value as a difference between said calculated ratio and a reference value;

(f) varying the gain of said nuclear well logging apparatus as a function of said error value; and (g) repeating steps (a) through (f) as said nuclear well logging apparatus is moved in said borehole.

10. The method of claim 9, wherein said step of varying said gain of said nuclear well logging apparatus includes varying a voltage supply level for a photomultiplier detector where said error value exceeds a predetermined range.

11. The method of claim 9, wherein said step of varying said gain of said nuclear well logging apparatus includes varying a gain of a signal conditioning circuitry where said error value exceeds a predetermined range.

* * * * *